United States Patent [19]
England

[11] 3,973,350
[45] Aug. 10, 1976

[54] FISHING LURE WITH PRESSURE SENSING AND HYDROSTATICALLY CONTROLLED DEPTH SELECTION AND GUIDANCE MEANS

[76] Inventor: Will Clarke England, 7310 Eastcrest Drive, Austin, Tex. 78752

[22] Filed: Dec. 19, 1974

[21] Appl. No.: 534,624

[52] U.S. Cl. ............................ 43/42.03; 43/42.06; 43/42.39
[51] Int. Cl.² ........................................ A01K 85/00
[58] Field of Search ............... 43/42.03, 26.2, 42.06, 43/42.39, 43.13

[56] References Cited
UNITED STATES PATENTS

| | | | |
|---|---|---|---|
| 2,665,512 | 1/1954 | Sullivan et al. | 43/42.03 |
| 2,703,947 | 3/1955 | Petrasek et al. | 43/42.39 |
| 2,715,790 | 8/1955 | Carpenter | 43/42.39 X |
| 2,749,646 | 6/1956 | Hall | 43/42.39 X |
| 2,928,367 | 3/1960 | McCormick | 43/43.13 X |

*Primary Examiner*—Russell R. Kinsey
*Assistant Examiner*—Daniel J. Leach

[57] ABSTRACT

An artificial fishing lure having pressure sensing and hydrostatically controlled depth selection and guidance means adapted to cause said lure to seek and hold a predetermined depth in a body of water where fish of a selected species may be expected to be found. The lure is made of buoyant material and comprises a central cavity housing a hydrostatic pressure-sensitive rotary piston. A pair of elevator fins are mounted on the sides of the lure body and move up and down upon rotary motion of the piston in response to changes in water pressure.

20 Claims, 9 Drawing Figures

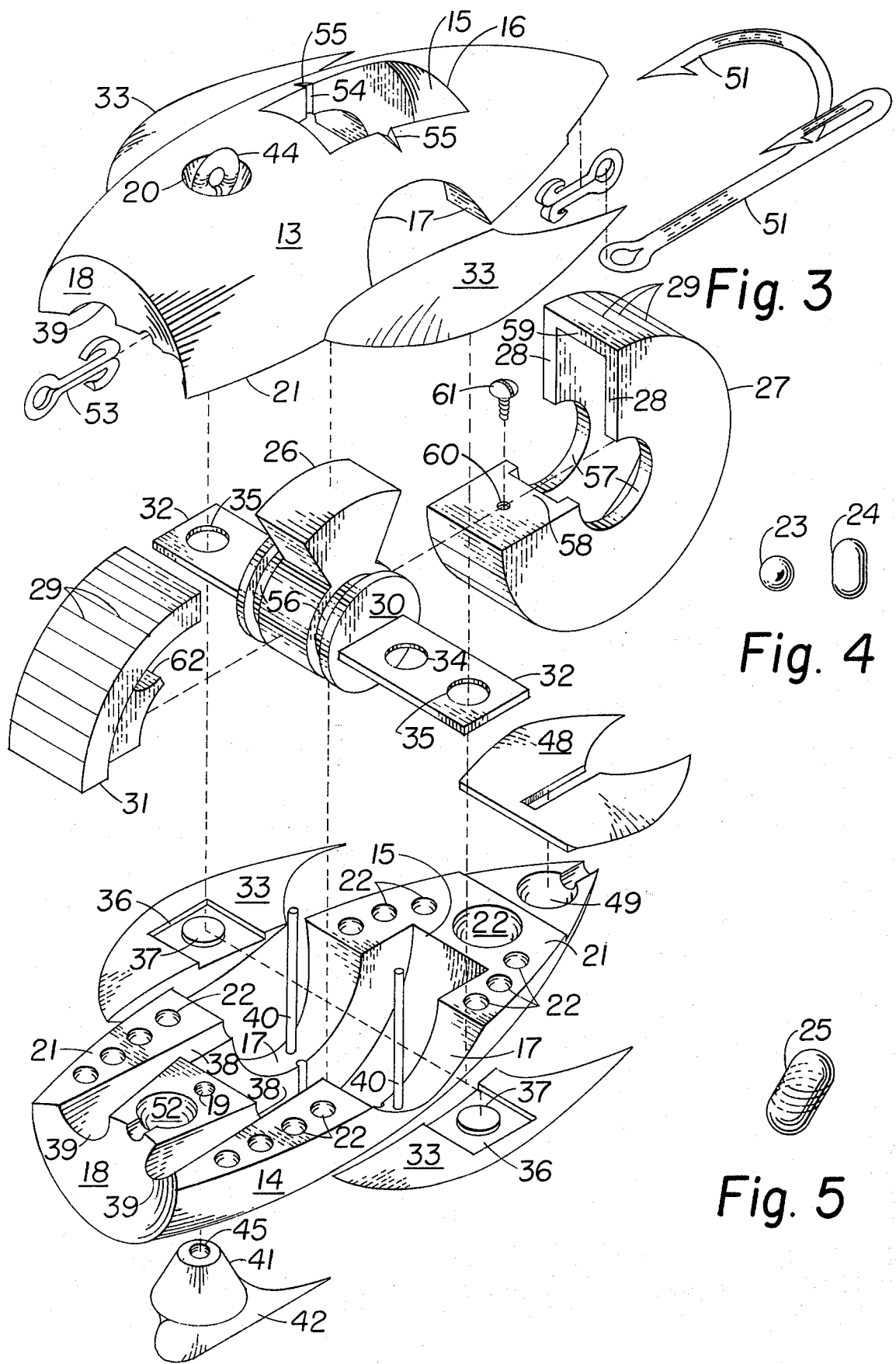

FISHING LURE WITH PRESSURE SENSING AND HYDROSTATICALLY CONTROLLED DEPTH SELECTION AND GUIDANCE MEANS

SUBJECT MATTER OF THE INVENTION

The invention relates generally to artificial fish lures and relates more specifically to lures provided with a self-contained guidance apparatus that is hydrostatically reactive to seek and maintain said lure at pre-set water pressure levels.

BACKGROUND OF THE INVENTION

Water in slow moving streams and in lakes, especially lakes produced by artificial dams, usually varies in temperature from cold at the bottom to relatively warm at the surface of the body of water with the water appearing to arrange itself into thermal stratas or layers. Experienced fishermen have long observed that particular types of fish tend to school and feed at particular temperature thermal levels in such bodies of water and it has also been observed that a school of fish that will show pronounced activity and strike at almost any moving object passing through the temperature stratum in which they are most active but will abandon the chase of bait or lure that sinks into water colder than their preferred habitat stratum or that rises above the thermal stratum in which the particular species of fish are particularly active. Therefore, fishermen have traditionally attempted to design and select lures that were heavy and that could be employed for trolling at great depth or near the bottom of a body of water or alternatively to select lures of varying buoyancy so that they would troll somewhat under the surface or at the surface of said body of water. If the lure was very heavy, it tended to sink not only to the desired level but eventually even beyond the desired strata. A buoyant lure intended for fishing at intermediate depths will usually tend to float upward with the passage of time and as the lure is pulled through the water with the result that the lure will soon rise above the temperature strata where fish of the desired species could be expected to strike. It is therefore, a primary object of this invention to devise and disclose a lure having a pressure sensing capacity and hydrostatically controlled depth selection and guidance means adapted to cause said lure to seek and to hold at a predetermined pressure stratum or depth where fish of the desired species might be expected to be found.

OBJECTS OF THE INVENTION

Fishermen for centuries have devised and fabricated pluralities of fishing lures made from materials from varying degrees of buoyancy to assist them trolling and fishing at selected depths in the water where fish were believed to live and to be most active. Such lures depended upon intuitive selection of a lure with appropriate buoyancy for the level at which the fisherman desired to fish, and as previously explained, such lures tended to either sink to undesirable depths if left in the water very long or as the lure was pulled in, the lure tended to rise above the selected depths. In order to overcome these difficulties and to eliminate or at least reduce the need for such a plurality of lures, it is a material object of this invention to substitute and provide a single adjustable pressure reactive fishing lure that can be programmed by manipulation of a calibrated mechanically operated depth control mechanism that will automatically cause said fishing lure to climb or to dive in the water in accordance with and in response to sensed pressure of the surrounding water until said fish lure has found and levelled out at the designated or pre-programmed pressure level.

Another object is to provide a hydrostatically responsive fish lure of the character described with provision for increasing or decreasing the specific gravity or buoyancy of said fish lure by means of simple mechanical adjustments.

A further object is to devise and provide a lure in which a pressure sensitive rotary piston in a rotary piston chamber mounted in the interior of said fish lure body that responds to the static pressure of surrounding water by the compression or expansion of a compressible gas in the rotary piston chamber thereby providing rotary adjustment motion to lateral elevator fins on the left and right sides of said fish lure body so that contraction or expansion of the compressible gas rotates the rotary piston and said left and right lateral elevator fins to cause the fish lure to dive to a lower level in accordance with the sensed static pressure of the surrounding water.

A still further object is to provide a body structure for said lure that includes water scoop means tailored to conduct some of the surrounding water through the interior of the fish lure body to a point where the water is channeled into direct contact with the pressure sensing and control element in order to provide minute and immediate responses of said fish lure to changes in the static pressure of the flowing water.

A further object is to provide a rotatably adjustable rudder-like ventral fin on the underside of the lure body that can be manipulated to cause said fish lure to skew to the left or to the right or even turn upside down momentarily as it is pulled through the water and thereby impart a more lifelike characteristic to the appearance of said lure.

Still another object is to design and provide a lure that will look and behave very much like a live lure and thereby be more attractive to the fish.

Another object is to supply mechanical means of limiting the adjustable maximum angle of climb or dive in order to prevent said lure from getting into a position where it can reverse position or become unstable.

A still further object is to provide an attachable-detachable weight that can be attached to the lower side of the lure body to provide horizontal stability for said lure but with further provision for reversing said weight from the bottom to the top of the lure in order to vary the horizontal stability.

Am important object involves provision for fabricating and attaching replaceable fins with substitute fins to provide the lure with a more attractive and realistic appearance for the habitat area in which the fisherman is fishing.

In furtherance of this objective of making the lure as realistic and life-like as possible a direct pivot plate interconnection has been provided between the supporting and driving rotary piston armature and the left and right lateral elevator fins. Since said rotary piston and armature provides a relatively unstable rotational mounting means and tends to respond to minute pressure changes the said left and right lateral fins tend to vibrate or flutter as said fish lure is drawn through the water producing an even more life-like appearance.

These and other objects and advantages will become apparent through consideration of the following description and appended claims in conjunction with the attached drawings in which:

DESCRIPTION OF THE SEVERAL VIEWS IN THE DRAWINGS

FIG. 3 is a perspective exploded view showing the parts of the lure.

FIG. 4 is a perspective drawing illustrating two types of solid weights that can be employed to alter the specific gravity of said fishing lure.

FIG. 5 is a perspective drawing of a variable buoyancy space capsule that can be employed to alter the specific gravity of said fishing lure.

Figure 1:
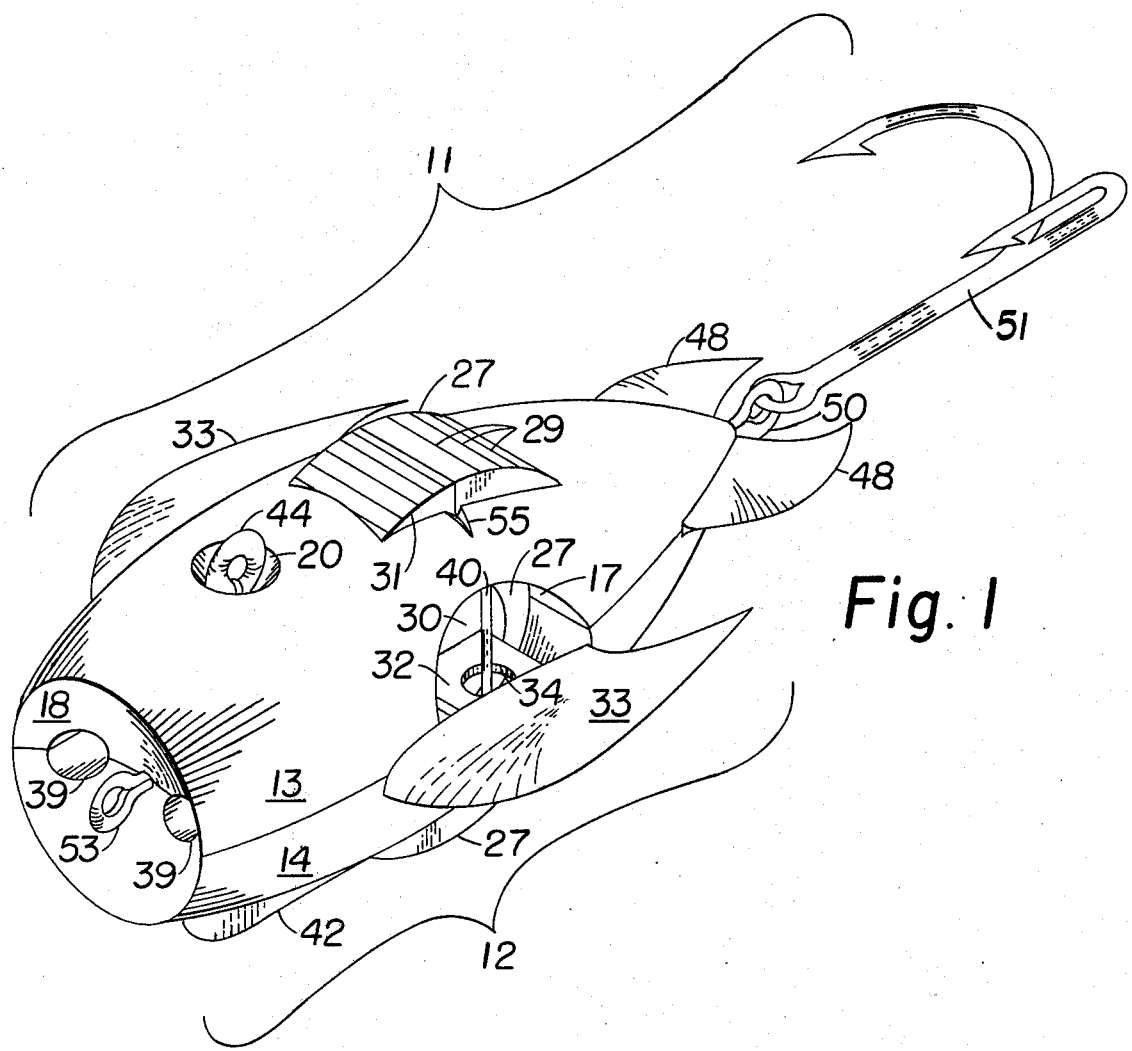
FIG. 1 is a perspective, pictorial view of the hydrostatically reactive pressure level seeking fishing lure assembled and ready for use.

In describing one selected form or preferred embodiment specific terms and components are used for clarity. However, it is not intended to limit the claimed invention to the specific form, components on construction shown and it is to be understood that the specific terms are intended to include all technical equivalents which operate in a similar manner to accomplish a similar purpose.

DETAILED DESCRIPTION OF PREFERRED EMBODIMENT OF INVENTION

Referring to the specific embodiment of the invention selected for illustration in the accompanying drawings, the overall hydrostatically responsive artificial fishing lure 11 is preferably fabricated from a very light plastic or a water buoyant material in the form of a generally elongated-cylindrical tear-drop fuselage body 12. Said lure fuselage body 12 starts with generally blunt front and tapers back to a generally symmetrical tear-drop rear end with lure body 12 being divided along a medial transverse plane to produce an upper lure body half 13 that can be separable from lower body half 14. Lure body 12 may be provided with exterior features of the character described herein or may be provided with conventional exterior features such as shape, appearance, fins, tow means and fish hook means.

The interior of lure body 12 is hollowed out to provide a central internal apparatus housing cavity 15 with the center portion of cavity 15 having a generally cylindrical shape cavity 15 is positioned perpendicular to the medial transverse plane of lure body 12 with the central axis thereof being in the medial transverse plane and perpendicular to axis of revolution of lure body 12.

It will be understood from an examination of FIG. 3 that a part of this cavity is in the upper half of body 13 while the remaining half of this cavity is in the lower half of body 14, but this description is being written in terms of the shape of the entire cavity as a single entity even though it actually is subdivided by the splitting of lure body 12 into upper and lower halves.

Housing cavity 15 is so designed or so positioned that one arc of its vertical circumference cuts through to an instrument adjustment surface opening 16 in at least one of the body halves. This surface opening, to provide for manual adjustment of the rotatable rotary piston chamber 27 and cylindrical segment spacer 31 that is to be contained in housing cavity 15, can be positioned on either the upper surface or the lower surface, or similar openings could be provided on both the top and the bottom halves of the lure in order to make the rotary piston chamber 27 and cylindrical segment spacer 31 accessible and adjustable from both sides of the lure.

The lure is provided with a pair of lateral port openings 17—17 of generally circular shape cut from the exterior sides of body 12 such that one of openings 17 is positioned on the left side of the body while the other opening is positioned on the right side of body 12 with each of the said openings cutting through into the housing cavity 15. Openings 17—17 should be positioned near the mid-point of the length of the lure and should be so positioned that the axis of said openings are substantially concentric with the center axis of housing cavity 15. In addition, openings 17—17 should be of sufficient size to permit surrounding water to freely flow into and out of housing cavity 15.

The nose or forward end of lure 11 is provided with a concave dish-shaped nose scoop 18 that is generally symmetically centered on the longitudinal axis of revolution of the lure body. This dish shaped surface is intended to aid in inducing and accelerating water through which lure 11 may be moving so that such water flow can be channeled through appropriate funneling port openings 17—17 and channeled through the water flow passageways 38—38 to the housing cavity 15 but the actual design and appearance of said scoop 18 has been tailored to simulate the appearance of a face with a nose and eyes.

It will be probably desirable to provide guide pins and means of releasably attaching the upper and lower lure body halves 13 and 14 to each other by any appropriate attaching and securing means, but there should also be provided at least one assembly hole passageway 19 cut from a forward intermediate point in the upper surface of the body and extending perpendicular through both halves to a similar intermediate point on the lower body half 14 with passageway 19 being provided with a concave countersink opening 20 at least one end of the passageway. In addition it will usually prove desirable to provide a duplicate concave counter sink opening 20 at the opposite end of passageway 19.

Since lure 11 can be substantially symmetrical about the length of its axis of revolution, there will be some tendency for the lure to roll as it pulled through the water. However, if the hydrostatically responsive depth guidance system is to operate consistently, some means must be found of providing anti-roll horizontal stabilization to insure that the dorsal side of said lure remains upright at most times. A plurality of anti-roll horizontal stabilization features is provided and the solution to the problem is made by employing a blend of several of these proposed features. At this point, however, it is relevant to point out that if the parts of body 12 are fabricated from materials having differential buoyancy characteristics so that the ventral portions of body 14 are provided with greater keel-effect weight of even larger non-symmetrical size than is present in the upper or dorsal half of body 13 that resulting shift of the center of gravity to a line below the longitudinal axis of body will help maintain the lure in upright position and will thereby improve the horizontal stability and anti-roll characteristics thereof.

Along the horizontal medial surfaces 21—21 there is provided a plurality of buoyancy and specific gravity adjustment wells 22—22 recessed at spaced apart intervals into the lure body structure and accessible along the medial transverse splitting plane that produces horizontal medial surfaces 21—21. A large buoyancy and specific gravity adjustment well 22 is provided in the center line near the posterior end of lure body 12. Air or space is captured in wells 22—22 illustrated in lower body half 14 in FIG. 3 but it should be remembered that similar or matching wells are also provided for and recessed into upper body half 13. When it is desirable to make the specific gravity weight of lure 11 heavier in order to fish at greater depths, this may be accomplished in part by inserting in wells 22—22 added ball-shaped weights 23—23, or if still greater weight is needed, then wells 22—22 can be loaded with metal or solid weights provided with an external shape like that of a capsule 24. Alternatively, when the fisherman wants to increase the buoyancy of the lure in order to fish at shallow depths the metal weights just described can be removed from the wells and the lure used with the wells left empty. If lure 11 is to be left in the water for some period of time, then some moisture or water will leak into and collect in the wells 22—22. Water can be prevented from collecting therein by filling the wells with captured space in the form of plastic water-tight capsule-shaped hollow plastic inserts 25—25 of the type illustrated in FIG. 5 which should, of course, be of such size and shape as to be easily inserted into or removed from the wells. Space capsules 25—25 should be about the same size and shape as capsules employed in dispensing prescription medication. Space capsules 25—25 will provide buoyancy if they are filled with air, or filled with a very light space occupying material such as styrofoam, but would provide maximum buoyancy with respect to water if the capsules were evacuated so that there was a good vacuum therein.

A pressure sensitive rotary piston 26 and rotary piston chamber 27 are mounted vertically and longitudinally in housing cavity 15 in such a manner that the pressure of the surrounding water can actuate piston 26 to produce rotary motion in armature 30 responsive to pressure from the surrounding water — with the resultant hydrostatically induced rotary motion being transmitted to an associated pair of lateral elevator fins 33—33 positioned on the left and right sides of the body so that pressure induced rotary motion in armature 30 causes the pair of elevator fins 33—33 to be driven up or down in such manner as to cause said fish lure 11 to climb or to dive in response to the sensed pressure in the surrounding water.

Piston chamber 27 together with the cylindrical segment spacer 31 are of such size and of such generally cylindrical dimensions as to fit conveniently into housing cavity 15 positioned perpendicular to the medial transverse plane of body 12 and in a mounting arrangement that will leave the center of armature 30 positioned in line with the axis of lateral port openings 17—17. The device could be manufactured and used with a medium fixed setting of the chamber 27 for a specific depth. However, greater flexibility and usefulness will be achieved if chamber 27 and spacer 31 are mounted as a rotatably adjustable sub-housing structure that could be manually adjusted or pre-set to determine the pressure strata level at which the fish lure would level out. Such a rotatably adjustable sub-housing structure has been fabricated in the form of the outer peripheries of chamber 27 and spacer 31. Chamber 27 and spacer 31 have the general appearance of a cylindrical donut when placed together to form a circle with the structure having the external appearance of a rotatable knob when the sub-housing structure is mounted in housing cavity 15 of lure body 12 such that only an outer arc portion of the adjustment device is visible through opening 16 in the exterior surface of said fish lure body. Chamber 27 is fabricated with spaced-apart inward extending rotary piston chamber sidewalls 28—28 such that the space therebetween provides a housing for the rotary piston 26 and rotary piston armature 30. Piston 26 armature 30 and chamber 27 are fabricated to match each other's proportions so that piston 26 and armature 30 will fit snugly but rotatably into the chamber 27 with the sides of the piston 26 against the sidewalls 28—28 and the outer periphery of the rotary piston 26 against the inner periphery of the peripheral chamber arc segment 59 while still having sufficient room for the rotary piston 26 and armature 30 to rotate in response to pressure changes. The outside surface area of chamber 27 and spacer 31 are provided with textured calibration marks 29—29 which permits said rotatable adjustable structure, when provided with such calibrations and mounted within the body of lure 11, to form a calibrated depth selection adjustment knob which can be manually adjusted by manipulation of the arc portion of the rotatable adjustable structure that is visible and accessible through opening 16.

The insertion of the rotary piston 26 and armature 30 into chamber 27 with the sides of said rotary piston 26 against the chamber sidewalls 28—28 and the outer periphery of said rotary piston 26 against the inner surface of the peripheral chamber arc segment 59 and the inner rails 57—57 of the chamber sidewalls 28—28 inserted into the rotary piston armature sealing recesses 56—56 and the inner surface of the rotary piston chamber head 58 in contact with armature 30, forms a enclosed gas chamber that is variable in volume with the rotation of the rotary piston 26. An increase in water pressure on the exposed portion of the rotary piston 26 causes a decrease in the enclosed volume and a corresponding increase in gas pressure. A decrease in water pressure causes an increase in the enclosed volume and a corresponding decrease in the gas pressure.

Although pressure is the most significant variable, sensed and governing the behavior of lure 11, lesser significant variables of temperature and volume with its related effects on buoyancy must be acknowledged. The compressible-expansible gas such as air in the chamber 27 does obey the gas law which means that both pressure and temperature have an effect on volume which in turn has an effect on the lure buoyancy. The changes of pressure in water, however, are generally much greater in magnitude than the temperature changes so that the changes in volume of gas once adjusted for the surface temperature will generally correspond to the pressure changes, and the buoyancy changes will generally correspond to the volume changes. Such correspondence makes the hydrostatically controlled and depth selection and guidance means a nearly direct function of pressure sensing.

As is illustrated in FIG. 3 the chamber 27 can occupy about three quarters of a circle with about one quarter occupied by the cylindrical spacer 31. Such angular proportions are about optimum to take advantage of the largest available enclosed volume in the rotary piston chamber without imposing undue complications in the manufacture of such chamber 27.

Figure 2:
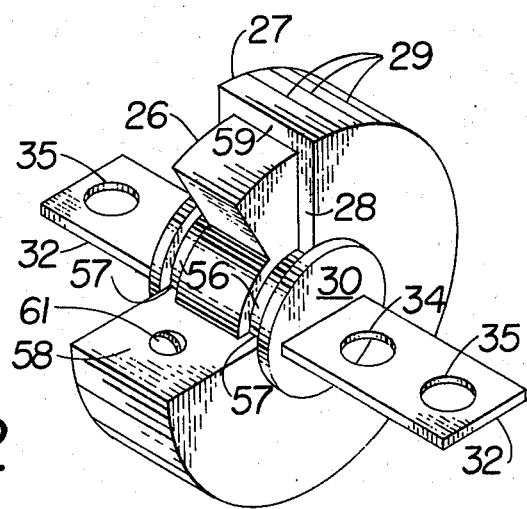
FIG. 2 is a perspective view of the assembled pressure sensing rotary piston and rotary piston chamber.

As is illustrated in FIG. 2 the rotary piston 26 and armature 30 insert snugly into chamber 27 and as can be seen in FIG. 3 chamber 27 and spacer 31 insert into housing cavity 15. When the rotary piston 26 is inserted into chamber 27 the enclosed volume decreases and the gas pressure is increased beyond the atmospheric pressure. With the apparatus installed the piston stop 62 on spacer 31 not only restrains the rotary piston 26 from escape from the chamber 27 but may do so with the enclosed gas pressure in excess of the atmospheric pressure. This can be done if it is desired to keep the lure 11 from reacting to any change in pressure as it dives until the pressure in the water equals the gas pressure in the enclosed chamber 27. If the lure 11 is to be reactive to any depth change below the surface, then the zero depth configuration must be set at a gas pressure in the enclosed chamber 27 equal to the surface pressure. This equalizing of pressure can be done after the rotary piston 26 is inserted into chamber 27 to the zero depth configuration by loosening or removing the bleeder port plug 61 from the bleeder port 60 and after the pressures are equalized by resecuring said plug 61. The zero configuration is generally where the exposed face of the rotary piston 26 rest on the piston stop 62 of the cylindrical segment spacer 31 when the apparatus is installed in housing cavity 15.

The rotation of the zero depth calibration on the top of the lure to a position forward of the depth calibration notches 55—55 will be to set calibration marks 29—29 to a depth below the surface because fins 33—33 will simultaneously be rotated to a dive configuration. Because the enclosed volume continues to decrease as the pressure becomes greater, the angular change at higher pressures will be less than the angular change at lower pressures and the calibration marks 29—29 should reflect this.

With the snug fit of the rotary piston 26 and armature 30 into chamber 27 and the need for the armature 30 to freely rotate in response to any pressure changes on the rotary piston, the pressure sensing apparatus can be made of any suitable rigid durable material that could be lubricated by some friction reducing coating. It is, however, preferred that the parts of the apparatus that slide against each other be made of some rigid durable material with a low coefficient of friction such as nylon or coated with teflon rather than use a liquid lubricant that will wash and wear off.

The armature riding on the inner rails 57—57 of the chamber sidewalls 28—28 provides for an associated flat pivot plate 32 installed in the center which will transmit rotary motion from rotary piston 26 to elevator fins 33—33. Pivot 32 is a generally rectangular flat plate fabricated from a strong material and is mounted transversely through the center of armature 30 and through the center of body 12 with the ends of said transversely positioned pivot plate extending outward through openings 17—17 on each side of said fish lure body. Each end of pivot plate 32 is provided with a pair of spaced apart apertures intermediately positioned from the outer ends thereof and spaced a slight distance away from armature 30 with the innermost part of perforations designated as rotation limiting apertures 34—34 while the outside apertures at each end of the pivot plate are designated as fin locking apertures 35—35.

It should be readily appreciated that fabrication of pivot plate 32 from metal or a similar strong material will allow efficient transfer of the rotation of the rotary piston 26 and armature 30 to elevator fins 33—33 to cause lure 11 to climb or dive in response to pressure changes. It will also be readily apparent to employ a strong attaching and securing means to attach pivot plate 32 to armature 30, such as embedding a metal pivot plate 32 in the plastic armature 30 or fabricating a homogeneous strong plastic assembly.

The rotary piston 26, chamber 27, armature 30 and spacer 31 can be factory fabricated as a replaceable and interchangeable modular unit with a plurality of interchangeable units designed to cover different ranges of pressure and pressure sensitivities. Since lure body 12 is divisible into separable upper and lower halves along the medial transverse plane, it can be readily opened to provide access to housing cavity 15 to facilitate replacement and substitution of hydrostatically responsive apparatus modules.

If fins 33—33 are fabricated from metal, they can be welded or directly and permanently attached to it pivot plate 32 and the metal surfaces of such fins will increase the sensitivity-durability of the hydrostatically responsive apparatus and fish lure. However, there may be instances where the employment of colored and/or special shaped plastic lateral fins 33—33 will outweigh the durability advantages of using metal lateral fins. Fins 33—33 therefore can be made in a form that can be releasably attached to each end of pivot plate 32 so that interchangeable lateral fins can be substituted as required. These fins could be attached and removed in a variety of ways but in the exploded view provided in FIG. 3, a shaped friction lock recess 36 is shown in each elevator fin adapted to be force fitted on each end of pivot plate 32. In addition a friction locking shoulder projection 37 is provided on each lateral fin with said friction locking shoulder 37 being adapted to snap into fin locking aperture 35.

Due to the stability of the hydrostatically responsive apparatus in leveling out and holding a specific static pressure level in the water, some means could be utilized to interrupt said stability to give the lure a more lively action. If, as the fishing lure is drawn through the water, a portion of the lure motion is converted into accelerated water flow into the central internal apparatus housing cavity, then this flow will be decelerated and cause minute static pressure changes on the exposed part of rotary piston 26. By intermittently changing the motion of the lure the pressure sensitive apparatus will cause the lure to bob and dip in response to such minute static pressure changes.

Figure 8:
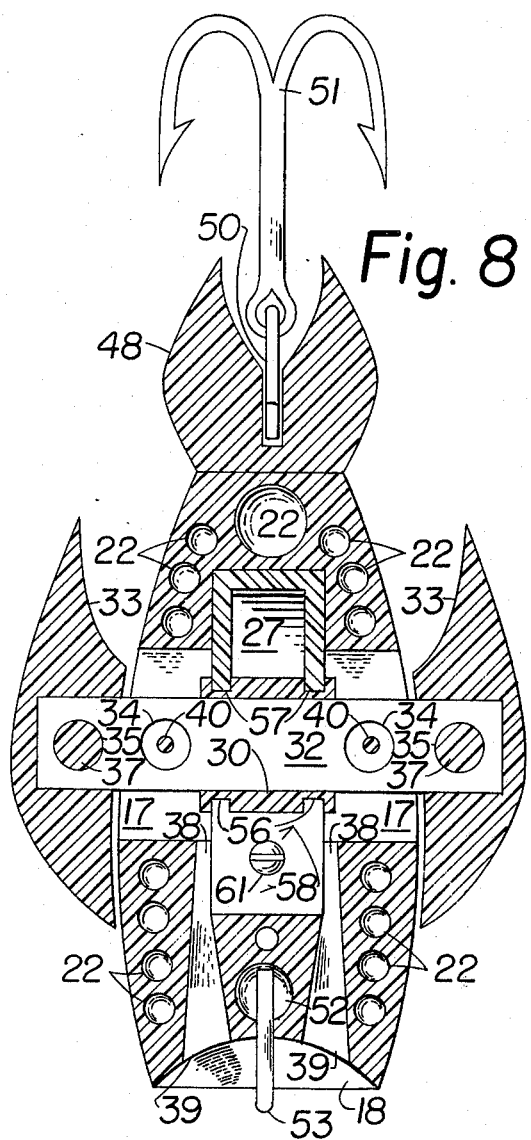
FIG. 8 is a top plan sectional view of the hydrostatically reactive fishing lure.
Figure 9:
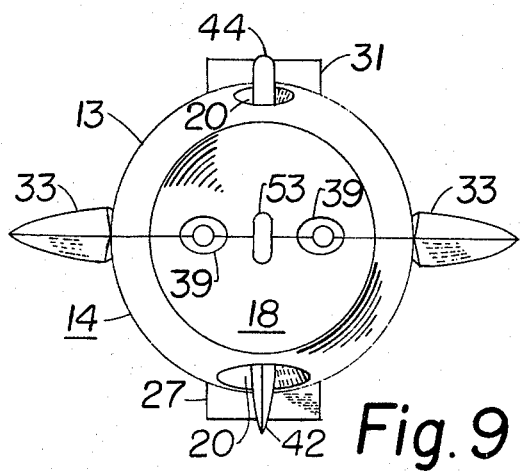
FIG. 9 is a front plan view of the lure.

A pair of spaced apart water flow passageways 36—36 is shown extending from spaced apart points in the forward portion of lure body 11 to points in housing cavity 15 on each side of rotary piston 26. The forward portions of passageways 38—38 are reamed out for a slight distance to form funnel-shaped water induction ports 39—39 with said funnel-shaped ports 39—39 tapering into passageways 38—38. The flared front openings of ports 39—39 are laterally spaced apart from the center axis of lure body at points inside nose scoop 18 as is shown in FIGS. 3, 8 and 9 so that the collective appearance of nose scoop 18, ports 39—39 and tow hook means simulate the appearance of a round face with nose and eye features. As lure 11 is pulled through the water, water is trapped and pressure builds up within nose scoop 18 with a portion of said water being driven into tapered or funnel-shaped ports 39—39 where it is compressed or accelerated by the diminishing size of passageways 38—38 until the water is spewed into housing cavity 15. After the inflowing water has served its purpose it can flow out through openings 17—17 on each side of the fish lure body.

Problems of control reversal are indicated when the lateral elevator fins 33—33 are adjusted beyond a ninety degree angle of climb or dive or when the lure flips over in the water; the hydrostatically reactive behavior characteristics will be reversed such that lure 11 will dive when it is supposed to climb and will climb when the lure is supposed to dive.

To remedy these control reversal problems, a pair of vertical restraint rods 40—40 is provided with each rod being vertically and centrally positioned in openings 17—17 in lure body 12 in such position that the left restraint rod 40 passes through the center of aperture 34 in pivot plate 32 while the right restraint rod 40 passes through aperture 17. An examination of the positioning and relationship between rod 40 and aperture 34 will indicate that at some maximum point of rotation that the circumference aperture 34 will become impacted upon rod 40 thereby limiting the maximum rate of climb or dive into which lure 11 can be placed. This restrictive feature substantially reduces the dangers of control reversal that would otherwise result from adjusting excessively steep rates of climb or dive.

A second source of instability can come from an intermittent tendency of lure 11 to roll in the water and become unstable when some particle in the water strikes only one of the lateral fins producing an unbalanced condition. To remedy this aspect, a weighted knee-like rudder fin 41-42 is rotatably-adjustably mounted on the under side of lure body 12. When lure 11 is fairly large in size and has considerable buoyancy, conical rotary adjustment wedge 41 can be fabricated from metal material to serve as a ventral weighting means but it will probably be desirable in most instances to fabricate said wedge 41 from a substantial plastic material of negligible weight. Attached to or fabricated as part of conical wedge 41, there is provided a ventral fin 42, which when rotated can serve as a rudder while the shape and ventral positioning of fin 42 restrains any tendency of fish lure 11 to roll in the water.

Satisfactory horizontal stabilization against roll instability may be achieved by fabricating ventral fin 42 from a metal material where the buoyancy of lure body 12 is sufficient to carry the weight of a metal fin 42. However, in the case of small lures which only modest buoyancy characteristics, the mere size and shape of a light all-plastic ventral fin 42 may be sufficient to provide the amount of anti-roll stability required to maintain lure 11 upright in the water. In other instances, where some amount of weight must be provided at a ventral point remote from the central longitudinal axis of lure body 12 in order to secure the desired keel-rudder effect needed for horizontal stabilization, some measure of ventral kneel weighting can be achieved by fabricating ventral fin 42 from a light plastic while achieving the necessary weighting effect by embedding small metal particles 43—43 into the lower most periphery of fin 42.

Any number of commercially available releasably-attachable securing means may be used to temporarily join together the top and bottom halves of lure 11. As previously mentioned, at least one of the passageways 19 should cut from a forward intermediate point in the upper surface of lure body 12, extending perpendicular through both halves of the body to a similar intermediate point on the ventral surface of the lower body half with each end of passageway 19 being provided with a concave counter-sink opening 20—20 at each end thereof.

An assembly bolt 44 is passed through passageway 19 and engages wedge 41 to mount and secure in position the wedge associated ventral fin structure.

Figure 6:
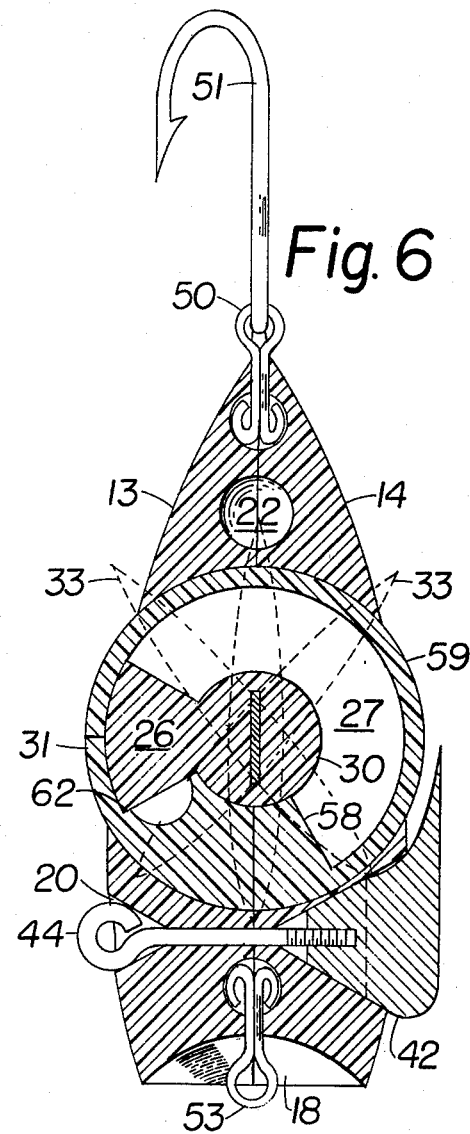
FIG. 6 is a side plan sectional view of the lure.

Conical wedge 41 is provided with a friction surface on the outside thereof so that it may be rotated and locked into place inside of opening 20 when assembly bolt 44 is loosened and subsequently retightened thereby providing simple manually manipulatable means of rotary adjustment for ventral fin 42. This enables fin 42 to be employed as an adjustable rudder to cause lure 11 to swerve to either the left or the right or even rotate upside down momentarily. The mechanical nature of the rotary adjustment means will be readily apparent from examination of exploded FIG. 3 and FIG. 6.

Figure 7:
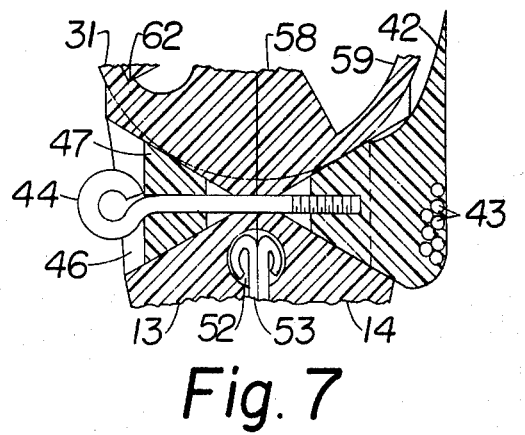
FIG. 7 is a plan sectional fragmentary side view of the front end of the fish lure showing an additional way of constructing a reversible front eyebolt stabilization weight and lower directional fin assembly.

With the weighted ventral fin 42 it may also be desirable to deliberately reverse the reactive behavior characteristics of lure 11 momentarily by a sudden pull on the lure with a skewed ventral fin 42 thus causing the lure to rotate upside down momentarily. In the case of the differential buoyancy lure body 12 with excess stability, it is necessary to release bolt 44 so that both bolt 44 and wedge 41 with ventral fin 42 are removed from lure 11. Thereafter, wedge 41 is inserted into the upper concave counter-sink recess 46 secured into place by bolt 44 inserted from the bottom of lure 11 through the ventral opening of passageway 19. This reversal of positioning of a weighted ventral fin 42 will reverse what constitutes the top and bottom of said fish lure, causing the fish lure to be less stable in the water. In those cases where said dive-climb characteristics of the differentially buoyant fish lure are to unstabilized by re-positioning of ventral fin 42 it will be desirable to make the concave counter-sink openings 20—46 at each end of assembly hole passageway 19 symmetrical with respect to each other as illustrated in FIG. 7. In the version of the fish lure 11 in which openings 20–46 have both been made large enough to accommodate wedge 41, passageway 19 will be shortened to a length inadequate to properly support assembly bolt 44. To brace and support bolt 44 in holding together the two halves of lure body 12 a conical spacer plug 47 is inserted into opening 20 that will contain the eyebolt end of bolt 44.

Lure 11 is provided with a set of posterior tail fins 48 made from a light plastic material. Tail fin 48 may be permanently or detachably secured to the rear end of lure body 12. A plurality of variably shaped and colored substitute tail fins may be provided for attachment to the lure body 12.

At the rear end of lure body 12, an anchor locking recess 49 extends into both the upper and lower body members 13 and 14. The posterior structure also includes a hook-eye anchor means 50 which locks or anchors into anchor recess 49 at one end while the hook-eye at the other end provides a hinged or flexible hook attaching means.

At the front end of lure body 12 a similar forward anchor locking recess 52 receives and secures a hook-eye attachment and locking means 53.

When lure 11 is employed for casting the lure will be intermittently alternated between environments of air and water with the result that air bubbles will become trapped in housing cavity 15 producing minor interference with water contact to the rotary piston 26. In order to assist said air pockets or air bubbles to leak off rapidly while the lure is still immersed in water a pair of air vent notches 54—54 is positioned on the left and right sides of instrument adjustment surface opening 16 starting from spaced-apart points in the upper apex of housing cavity 15 and extending upward along the left and right walls of opening 16 to merge into and terminate in calibration notches 55—55.

OPERATION

In normal operation, the depth selection and guidance means is first set to a specific pressure which will generally be below the atmospheric or surface pressure of the water unless a top water action is preferred. Since the temperature of the water may have some effect on the lure 11, it may be temporarily immersed manually in the surface and then adjusted by rotating the cylindrical members 27–31 such that fins 33—33 are parallel with the horizontal medial surfaces 21—21 of the fish lure body 12 and then reading the zero depth adjustment for that specific water temperature on the textured calibration marks 29 at the calibration notch 55. From this position the depth selection and guidance means is generally adjusted to a dive configuration with the specific depth plus or minus the zero depth adjustment set at the optimum feeding depth of the fish desired to be caught. After the line is attached, lure 11 may be used for casting or trolling. As the lure is retrieved after casting or during trolling from a boat, it will generally dive when it is set to a pressure higher than the surface of the water. As the lure approaches the set or desired depth and pressure in the water, the angle of dive will become less steep until the set pressure is reached whereupon the lateral elevator fins 33—33 will generally be in a position parallel to the horizontal medial surfaces 21—21 of lure body 12. If the water is calm and the pressure layers are generally parallel, the lure will, under a steady pull, plane at that level. If the water is turbulent with surface waves and the pressure distribution is more random, then the lure, as it is pulled through such waters, will continus to dive, ascend or even skew in seeking to maintain the preset pressure.

Since fins 33—33 are spring mounted they will vibrate or fluctuate about the mean setting of the fins as the lure is pulled and jerked through the water, thus giving a more life-like action to the lure.

If it is desired that a non-symmetrical or skewed action of the lure feign a hurt fish or bait, then the buoyancy can be imbalanced or the ventral fin or keel can be adjusted non-symmetrically.

For the most stable action of the fishing lure the line is attached to the hook-eye attachment means 53. Such centerline attachment, with the line of the towing force passing approximately through the center of gravity and drag, is relatively stabilizing whereas the line attached elsewhere will cause limited instability. Thus by attaching the line to the eye of assembly bolt 44, the lure can be made to shimmy or fluctuate sidewise as it is pulled through the water.

Although only a single embodiment of the device has been described together with the addition of a number of optional features with certain applications thereof, it should be understood that structural or material rearrangements of adequate or equivalent parts, substitutions of equivalent functional elements and other modifications in structure can be made and other applications devised without departing from the spirit and scope thereof. The description and drawings herein should be regarded as only an illustration and as limited only as set forth in the following claims.

I claim:

1. An artificial fishing lure having pressure sensing and hydrostatically controlled depth selection and guidance means adapted to cause said fish lure to seek and hold a predetermined depth in a body of water where fish of a selected species may be expected to be found, said hydrostatically responsive fishing lure comprising:
   A. a fish lure body fabricated from buoyant material and provided with
      1. conventional exterior features such as shape, appearance, fins, tow means, and fish hook means, and
      2. a central internal apparatus housing cavity within said fish lure body, and with
   B. a hydrostatic pressure sensitive rotary piston and compressible gas rotary piston chamber apparatus mounted in said central internal apparatus housing cavity within the fish lure body at a location where the pressure sensitive apparatus can be subject to and hydrostatically responsive to the pressure at various depths in the water; with the hydrostatically induced rotary motion being transmitted to
   C. an associated pair of left and right lateral elevator fins positioned on the left and right sides of said fish lure body so that hydrostatically induced rotary motion of the rotary piston will rotate said lateral fins up or down to cause said moving fish lure to climb or dive in response to sensed static pressure of the water; and with
   D. interchangeable attachable-detachable fins to enable the fisherman to tailor the decorative ornamentation features of said fish lure to comply with his own preferences or the appearance that the fisherman thinks will be attractive to the fish he hopes to catch.

2. An artificial fishing lure having pressure sensing and hydrostatically controlled depth selection and guidance means adapted to cause said fish lure to seek and hold a predetermined depth in a body of water where fish of a selected species may be expected to be found, said hydrostatically responsive fishing lure comprising:
   A. a fish lure body fabricated from buoyant material and provided with
      1. conventional exterior features such as shape, appearance, fins, tow means and fish hook means,
      2. said fish lure body being divisible into an upper body half and a separable lower body half,
      3. a central internal apparatus housing cavity within said fish lure body, and with
      4. left and right lateral port openings cut from the sides of the fish lure body into said central interior housing cavity with said lateral port openings being of sufficient size to permit surrounding water to freely flow into and out of said central interior housing cavity within the fish lure body;

B. a hydrostatically pressure sensitive rotary piston and gas compression rotary piston chamber apparatus mounted vertically and longitudinally in said central internal apparatus housing cavity within the fish lure body in such manner that the static pressure of the surrounding water can actuate said rotary piston to produce hydrostatically induced rotary motion in the rotary piston that is transmitted to;

C. an associated generally rectangular flat pivot plate mounted transversely through the left and right lateral port openings and through the said central internal apparatus housing cavity and installed in the armature of said rotary piston so that pressure induced changes in the rotary piston position produces rotary motion in said pivot plate; which hydrostatically induced rotary motion is transmitted by the pivot plate to;

D. left and right elevator fins attached to either end of said pivot plate in such manner as to position said fins on each side of the fish lure body so that pressure induced expansion or contraction of the compressed gas in the rotary piston chamber delivers rotary motion from the rotary piston through the pivot plate to said left and right elevator fins to drive said hydrostatically responsive fish lure up or down in accordance with the static pressure of the water.

3. The hydrostatically responsive fishing lure and apparatus described in claim 2 in which the body structure is fabricated from materials having differential buoyancy characteristics so that the ventral portions of said fish lure body are provided with greater keel-effect weight than is present in the upper parts of said fish lure body in order to improve the horizontal stability and anti-roll characteristics of said hydrostatically responsive artificial fishing lure.

4. The hydrostatically responsive fishing lure and apparatus described in claim 2 with interchangeable attachable-detachable fins to enable the fisherman to tailor the decorative ornamentation features of said fish lure to comply with his own preferances or the appearance that the fisherman thinks will be attractive to the fish he hopes to catch.

5. The hydrostatically responsive fishing lure and apparatus described in claim 2 with the further provision of
A. a pair of spaced apart water flow passageways extending from spaced apart points in the forward nose portion of the fish lure body to points in the central internal apparatus housing cavity on each side of the rotary piston; and
B. a pair of spaced apart funnel shaped water induction ports starting in forward nose portion of the fish lure body and merging into said water flow passageways such that as the fish lure is drawn through a body of water, that some of the surrounding water is scooped up and accelerated by said funnel-shaped water induction ports and channeled into the central apparatus housing cavity at points on each side of said rotary piston where the kinetic head of the flowing water is converted to an increase in the static pressure when said lure is drawn through the water.

6. The hydrostatically responsive fishing lure and apparatus described in claim 2 with further provision of
A. a plurality of buoyancy and specific gravity adjustment wells recessed at spaced apart intervals into the fish lure body structure and accessible along the medial transverse splitting plane and surface of each half of said fish lure body; and
B. a plurality of shaped insertable-removable weights of varying sizes that can be inserted into the specific gravity adjustment wells to make said fish lure sink more rapidly to greater depth when increased weight is needed.

7. The hydrostatically responsive fishing lure and apparatus described in claim 2 with further provision of
A. a plurality of buoyancy and specific gravity adjustment wells recessed at spaced apart intervals into the fish lure body structure and accessible along the medial transverse splitting plane and surface of each half of said fish lure body; and
B. a plurality of watertight capsule shaped buoyant plastic inserts of such size as to be easily inserted into or removed from said specific gravity adjustment wells.

8. The hydrostatically responsive fishing lure and apparatus described in claim 2 with further provision of a horizontal stabilizing weight to prevent said fish lure from rolling over as the lure travels in the water.

9. The hydrostatically responsive fishing lure and apparatus described in claim 2 with further provision of a combination rotatable horizontal stabilizing weight and ventral rudder fin to enable said fish lure to skew left or right in the water without rolling over.

10. The hydrostatically responsive fishing lure and apparatus described in claim 2 with the provision of restraint means to limit the angle of climb or the angle of dive.

11. The hydrostatically responsive fishing lure and apparatus described in claim 5 with said fish lure body structure being provided with a concave and generally dish shaped nose scoop structure at the forward end of said fish lure with said dish shaped nose scoop configuration of said nose scoop being structured and ornamented to simulate the appearance of a round face while the concave dish shaped structure can induce and accelerate water flow into said lure.

12. An artificial fishing lure having pressure sensing and hydrostatically controlled depth selection and guidance means adapted to cause said fish lure to seek and hold a predetermined depth in a body of water where fish of a selected species may be expected to be found, said hydrostatically responsive fishing lure comprising:
A. a generally elongated-cylindrical tear drop fuselage body
  1. fabricated from a water-buoyant material,
  2. being divided into generally symmetrical halves along a medial transverse plane producing an upper body half that is separable from the lower body half,
  3. a central internal apparatus housing cavity,
    a. having a cylindrical shape,
    b. positioned perpendicular to the medial transverse plane of the lure body,
    c. the center axis of said cylindrical-shaped apparatus housing cavity being in the medial transverse plane and perpendicular to the axis of revolution of the lure body, d. said central internal apparatus housing cavity cutting through to a surface opening in at least one of the body halves of said fish lure,
4. a pair of lateral port openings cut from the exterior sides of the fish lure body into the central internal housing cavity
   a. positioned near the midpoint of the length of said fish lure, and
   b. that is positioned such that the axis of said lateral port openings are substantially concentric with the center axis of said central internal apparatus housing cavity,
5. a concave dish-shaped nose scoop symmetrical centered on the longitudinal axis of revolution at the forward end of said fish lure fuselage body,
6. at least one assembly hold passageway
   a. cut from forward intermediate point in the upper surface of the fish lure body,
   b. extending perpendicular through both halves of said fish lure body to a similar intermediate point on the lower body half, and
   c. provided with convex counter-sink openings at each end of said assembly passageway;
B. a rotary piston
   1. being of a cylindrical segment shape,
   2. a rotary piston armature, connected thereto
      a. being of a cylindrical shape,
      b. having circumferential sealing recesses at each end of said armature;
C. a rotary piston chamber installed in the central internal apparatus cavity
   1. being of an outer cylindrical segment shape,
   2. having an inner cylindrical segment space for housing the rotatable rotary piston and the enclosed compressible gas
      a. the rotary piston chamber sidewalls with inner circumferential rails sealingly fit into the circumferential sealing recesses of the rotary piston armature and sealingly riding on the sides of the rotary piston,
      b. a rotary piston chamber head with an inner concave surface sealingly riding on the cylindrical armature and connected to the chamber sidewalls, and
      c. the peripheral chamber segment connected to the chamber sidewalls and chamber head and sealingly riding on the outer periphery of the rotary piston, with depth calibration marks on the outside of said peripheral chamber segment;
D. a cylindrical segment spacer and piston stop also installed in the central internal apparatus cavity with depth calibration marks on the outer periphery, said spacer completing a rotatable cylinder with said rotary piston chamber which can be manually rotatably preset for a desired water depth, said piston stop keeping the rotary piston sealingly inserted in said rotary piston chamber;
E. a generally rectangular flat pivot plate installed in the rotary piston armature with
   1. the longitudinal axis of said flat pivot plate being corresponding to the rotational axis of the rotary piston armature, such that
   2. said pivot plate is mounted transversely through the center of the rotary piston armature and through the center of the fish lure body with the ends of said transversely positioned pivot plate extending outward through the lateral port openings on each side of the fish lure body, and
   3. each end of said flat pivot plate being provided with a pair of spaced apart apertures intermediately positioned from the outer ends of said pivot plate and spaced a slight distance away from the pressure sensing rotary piston, with the innermost pair of perforations being designated as rotation limiting apertures and the outside apertures at each end of the pivot plate being designated as fin locking apertures;
F. a pair of vertical restraint rods, each restraint rod being mounted vertically and centrally in one of the left and right lateral port openings in the fish lure body such that the left restraint rod passed through the center of the left rotation restraint aperture in the pivot plate and the right restraint rod passes through the right restraint aperture in said pivot plate;
G. left and right lateral elevator fins rigidly attached to either end of said flat pivot plate;
H. a set of lateral posterior tail fins securely attached to the rear end of the fuselage body structure of said fish lure;
I. a ventral fin that is rotatably attached to the forward underside of the lower half body portion of said fish lure;
J. a tow line attachment means mounted at an appropriate position in the forward portion of the fish lure body;
K. fish hook means flexibly connected to the reare end of said fish lure body; and
L. means for releasably attaching and securing the upper and lower halves of said fish lure body together including some form of bolt securing means extending through the vertical assembly passageway provided in the forward portion of said fish lure body structure.

13. The hydrostatically responsive fishing lure and apparatus described in claim 12 in which the body structure is fabricated from materials having differential buoyancy characteristics so that the ventral portions of said fish lure body are provided with greater keel-effect weight than is present in the upper parts of said fish lure body in order to improve the horizontal stability and anti-roll characteristics of said thermally responsive artificial fishing lure.

14. The hydrostatically responsive fishing lure and apparatus described in claim 12 with the further provision of
A. a pair of spaced apart water flow passageways extending from spaced apart points in the forward nose portion of the fish lure body to points in the central internal apparatus housing cavity on each side of the rotary piston; and
B. a pair of spaced apart funnel shaped water induction ports starting in forward nose portion of the fish lure body and merging into said water flow passageways such that as the fish lure is drawn through a body of water, that some of the surrounding water is scooped up and accelerated by said funnel-shaped water induction ports and channeled into the central apparatus housing cavity at points on each side of said rotary piston where the kinetic head of the flowing water is converted to an increase in the static pressure when said lure is drawn through the water.

15. The hydrostatically responsive fishing lure and apparatus described in claim 12 with further provision of
   A. a plurality of buoyancy and specific gravity adjustment wells recessed at spaced apart intervals into the fish lure body structure and accessible along the medial transverse splitting plane and surface of each half of said fish lure body; and
   B. a plurality of shaped weights of varying sizes that can be inserted into the specific gravity adjustment wells to make the fish lure heavier in fishing at greater depths.

16. The hydrostatically responsive fishing lure and apparatus described in claim 12 with further provision of
   A. a plurality of buoyancy and specific gravity adjustment wells recessed at spaced apart intervals into the fish lure body structure and accessible along the medial transverse splitting plane and surface of each half of said fish lure body; and
   B. a plurality of watertight capsule shaped buoyant plastic inserts of such size as to be easily inserted into or removed from said specific gravity adjustment wells.

17. The hydrostatically responsive fishing lure and apparatus described in claim 12 adapted to receive and use a replaceable and interchangeable insertable-removable hydrostatically responsive module designed to perform over a selected pressure range with said hydrostatically responsive module including
   A. a rotary piston chamber adapted to insertably-removably fit into the central apparatus housing cavity in said artificial fish lure body and to provide a rotatably adjustable housing for the apparatus enumerated in this claim;
   B. a rotary piston partially housed by said rotary piston chamber;
   C. a cylindrical segment spacer and piston stop; and
   D. an attached pivot plate transversely mounted through the center of the rotary piston armature and adapted to have lateral elevator fins attached to each end of said transverse pivot plate;
with said sub-assembly manufactured as a replaceable-interchangeable package unit for use in said hydrostatically responsive fishing lure.

18. The hydrostatically responsive fishing lure and apparatus described in claim 12 in which there is provided a pair of spaced apart air vent notches extending from the upper apex of the central apparatus housing cavity in said fish lure body structure through to the dorsal surface of said fish lure to provide a means for air bubbles trapped in the apparatus housing cavity to escape from said cavity.

19. The hydrostatically responsive fishing lure and apparatus described in claim 12 with further provision of a combination rotatable horizontal stabilizing weight and ventral rudder fin to enable said fish lure to skew left or right in the water without rolling over.

20. The hydrostatically responsive fishing lure and apparatus described in claim 12 with interchangeable attachable-detachable fins to enable the fisherman to tailor the decorative ornamentation features of said fish lure to comply with his own preferences or the appearance that the fisherman thinks will be attractive to the fish that he hopes to catch.

* * * * *